(12) United States Patent  
Zhang et al.

(10) Patent No.: US 9,043,908 B1  
(45) Date of Patent: May 26, 2015

(54) DETECTION OF ENCRYPTION AND COMPRESSION APPLICATIONS

(71) Applicants: Cheng Zhang, Nanjing (CN); Weisheng Xue, Nanjing (CN); Qiuer Xu, Nanjing (CN)

(72) Inventors: Cheng Zhang, Nanjing (CN); Weisheng Xue, Nanjing (CN); Qiuer Xu, Nanjing (CN)

(73) Assignee: Trend Micro Incorporated, Tokyo (JP)

(*) Notice: Subject to any disclaimer, the term of this patent is extended or adjusted under 35 U.S.C. 154(b) by 102 days.

(21) Appl. No.: 13/865,582

(22) Filed: Apr. 18, 2013

(51) Int. Cl.  
*G06F 21/52* (2013.01)  
*G06F 21/55* (2013.01)  
*H04L 29/06* (2006.01)

(52) U.S. Cl.  
CPC ............ *G06F 21/52* (2013.01); *H04L 63/1416* (2013.01); *G06F 21/554* (2013.01)

(58) Field of Classification Search  
None  
See application file for complete search history.

(56) References Cited

U.S. PATENT DOCUMENTS

| | | | |
|---|---|---|---|
| 6,493,709 B1 | 12/2002 | Aiken | |
| 6,584,470 B2 | 6/2003 | Veale | |
| 7,031,972 B2 | 4/2006 | Ren et al. | |
| 7,516,130 B2 | 4/2009 | Ren et al. | |
| 7,702,683 B1 | 4/2010 | Kirshenbaum | |
| 7,809,670 B2 * | 10/2010 | Lee et al. ..................... | 706/59 |
| 8,181,036 B1 * | 5/2012 | Nachenberg ................. | 713/189 |
| 8,266,150 B1 | 9/2012 | Lin et al. | |
| 8,359,472 B1 | 1/2013 | Ren et al. | |
| 2003/0172066 A1 | 9/2003 | Cooper et al. | |
| 2003/0182310 A1 | 9/2003 | Charnock et al. | |
| 2004/0162786 A1 | 8/2004 | Cross et al. | |
| 2004/0199491 A1 | 10/2004 | Bhatt | |
| 2006/0253439 A1 | 11/2006 | Ren et al. | |
| 2008/0195606 A1 | 8/2008 | Ren et al. | |

OTHER PUBLICATIONS

Muhammad Sharif, et al. "Multiple Values Search Algorithm" 2007—Spring 2008, pp. 49-58, vol. 1, No. 2, Journal of Information & Communication Technology.  
Chakrabarti, et al. "Scalable feature selection, classification and signature generation for organizing large text databases into hierachical taxonomies", 1998, pp. 163-178, vol. 7, No. 3, VLDB Journal.  
Anagnostopoulos, A. et al., "Sampling Search-Engine Results," Proceedings of the 14th International Conference on World Wide Web, WWW 2005, May 10-14, 2005, pp. 245-256, Chiba, Japan.  
Chen. J., et al., "Knowledge Discovery and Data Mining Based on Power Plant Real-Time Database: A Survey", Oct. 8-12, 2001, pp. 1-5, Proceedings of International Conference on Power Engineering, Xi'an, China.  
Chen, L., et al., "Template Detection for Large Scale Search Engines," Apr. 23-27, 2006, 5 pgs., SAC '06, Dijon, France.  
Hamilton. N., "The Mechanics of a Deep Net Metasearch Engine", 2003, 2 pgs., Proceedings of the 12th International World Wide Web Conference.

(Continued)

*Primary Examiner* — Gilberto Barron, Jr.  
*Assistant Examiner* — Simon Kanaan  
(74) *Attorney, Agent, or Firm* — Okamoto & Benedicto LLP

(57) ABSTRACT

Detection of an encryption or compression application program may be based on similarity between read files read by a process of the application program and write files written by the process. Read fingerprints of the read files and write fingerprints of the write files are generated. A listing of the read fingerprints is searched for presence of matching write fingerprints to find matched fingerprints. The similarity is calculated based on the read fingerprints and matched fingerprints.

14 Claims, 4 Drawing Sheets

(56) References Cited

OTHER PUBLICATIONS

Jessop, M., et al., "Pattern Matching Against Distributed Datasets", 2004, 6 pgs. University of York, UK.

Lai, W.C., et al., "An Anatomy of a Large-Scale Image Search Engine", Dec. 2002, 4 pgs., IEEE MSE, Santa Barbara, CA.

Lavrenko, V., et al., "Relevance Models for Topic Detection and Tracking", 2002, 6 pgs., University of Massachusetts, MA.

Pallickara, S. et al., "Incorporating an XML Matching Engine in Distributed Brokering Systems", 2003, pp. 1-7, Proceedings of the International Conference of Parallel and Distributed Processing Techniques and Applications (PDPTA '03).

* cited by examiner

DETECTION OF ENCRYPTION AND COMPRESSION APPLICATIONS

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND OF THE INVENTION

1. Field of the Invention

The present invention relates generally to computer security, and more particularly but not exclusively to methods and apparatus for detecting applications.

2. Description of the Background Art

Classification of application programs, which is also referred to herein as "applications", has various uses in the field of computer security. For example, an application may be classified to determine if the application is a computer virus. One way of classifying an application is by behavior monitoring. As a particular example, an application may be monitored to determine if it behaves like a computer virus.

Unfortunately, there is no known general solution for detecting every class of applications. While behavior monitoring is suitable for classifying applications to detect computer viruses, behavior monitoring is not effective in detecting other applications, such as encryption and compression applications.

SUMMARY

In one embodiment, detection of an encryption or compression application program may be based on similarity between read files read by a process of the application program and write files written by the process. Read fingerprints of the read files and write fingerprints of the write files are generated. A listing of the read fingerprints is searched for presence of matching write fingerprints to find matched fingerprints. The similarity is calculated based on the read fingerprints and the matched fingerprints.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
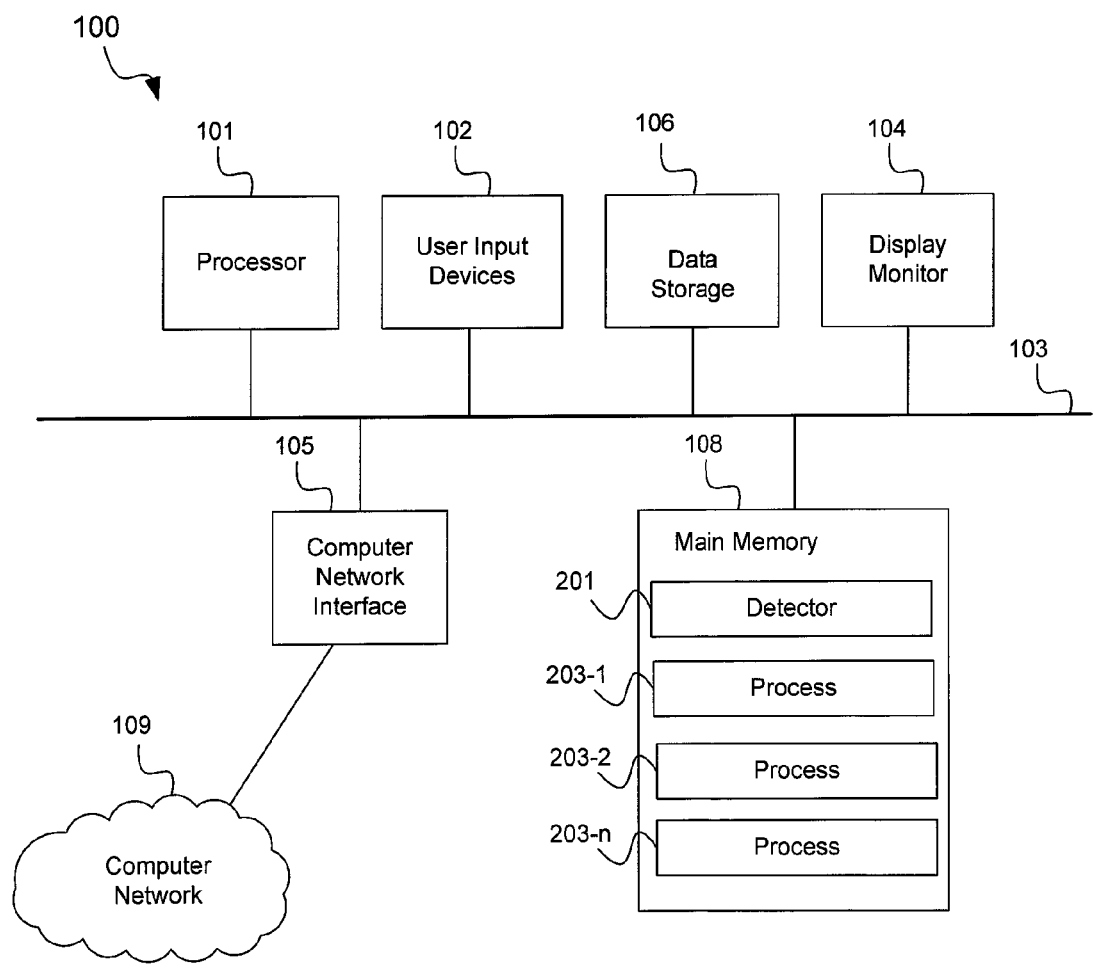
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may have fewer or more components to meet the needs of a particular application. The computer 100 may include a processor 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor, cathode ray tube), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with software modules, which comprise computer-readable program code stored non-transitory in the main memory 108 for execution by the processor 101. In the example of FIG. 1, the software modules include an encryption/compression application detector 201, processes 203 (i.e., 203-1, 203-2, . . . , 203-$n$), and other software modules not shown (e.g., operating system). The processes 203 are processes of various application programs that are currently running.

The detector 201 may comprise computer-readable program code that determines whether any of the processes 203 is a process of an encryption/compression application, i.e., an application for performing file encryption, file compression, or both. In other embodiments, the detector 201 may be implemented as programmed logic (e.g., as an application specific integrated circuit), in firmware, or other implementation.

Generally speaking, file encryption/compression involves reformatting a file in a reversible way. More specifically, a file encryption application may encrypt an input file into an encrypted file. The encrypted file may be decrypted back into the input file using a key and the appropriate decryption algorithm. Compression is similar to encryption but also involves reducing the size of the input file. Typical compression applications reformat the input file into a smaller compressed file. Compression may also require a key, a particular decompression algorithm, or both, to decompress the compressed file back into the input file.

Encryption/compression applications may be employed to perform data leakage or other cybercrime. To get around data leakage prevention (DLP) technology, cybercriminals may pre-process stolen confidential information, such as personal information, company trade secrets, and the like, by using an encryption or compression application to encrypt or compress a file containing the confidential information. The resulting encrypted or compressed file can't be properly scanned by DLP technology without the requisite key or algorithm to restore the file back to its original format.

It is also not easy to detect encryption/compression applications. Detection by application name is not feasible because application names can be readily changed. Furthermore, some encryption/compression applications are not well known, so their names and other identities are not readily recognizable.

In one embodiment, the detector 201 monitors a process 203 running in the computer 100, collects files that are read by the process 203 (also referred to herein as "read files"), collects files that are written by the process 203 (also referred to herein as "write files"), generates fingerprints of the read files (also referred to herein as "read fingerprints"), generates fingerprints of the write files (also referred to herein as "write fingerprints"), and determines similarity between the read files and the write files from the read fingerprints and the write fingerprints. In one embodiment, the detector 201 deems a process 203 to be that of an encryption/compression application if the similarity is less than a similarity threshold. The detector 201 may perform various responsive actions upon detection of an encryption/compression application including informing another program, such as a DLP program, or an administrator, for example.

Figure 2:
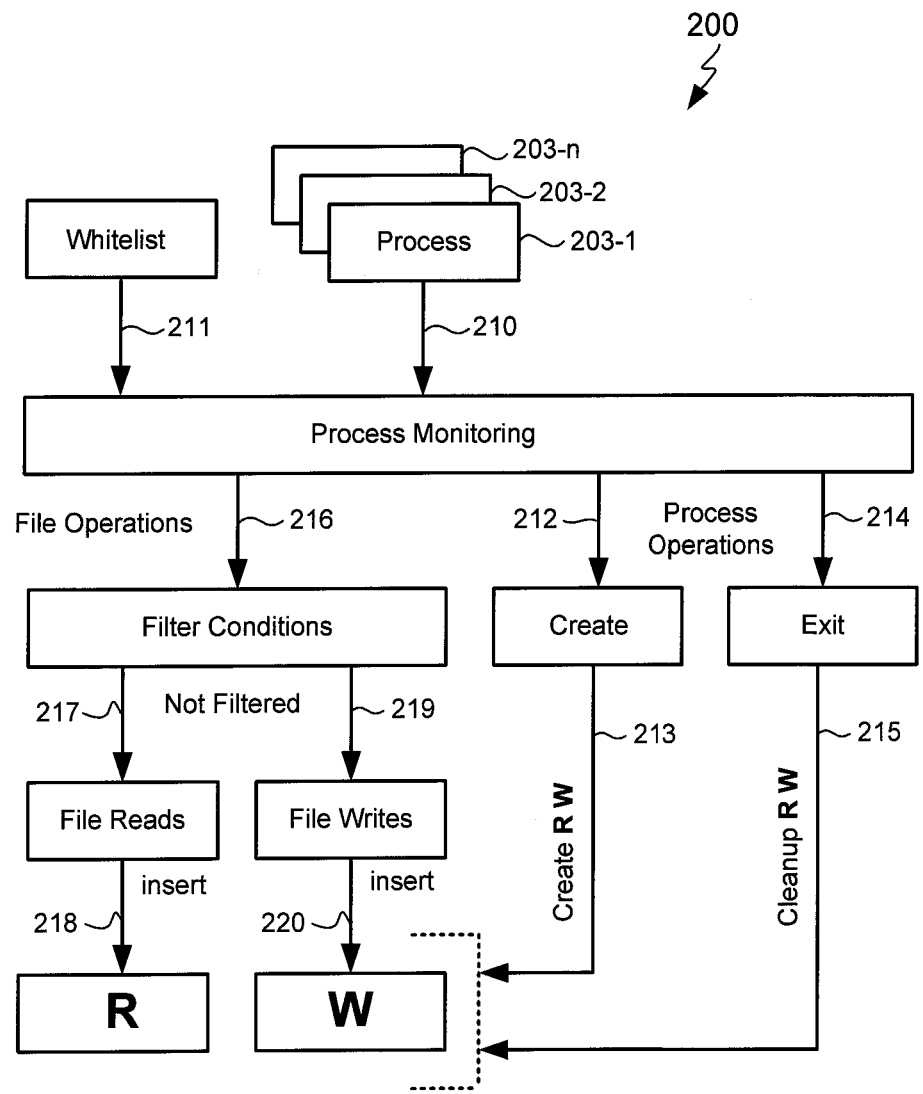
FIG. 2 shows a flow diagram of a method of generating a listing of read files and a listing of write files in accordance with an embodiment of the present invention.

FIG. 2 shows a flow diagram of a method 200 of generating a listing of read files R and a listing of write files W in accordance with an embodiment of the present invention. In one embodiment, the method 200 is performed by the detector 201. Other components may also be employed without detracting from the merits of the present invention.

In the example of FIG. 2, the detector 201 performs process monitoring (see arrow 210) to monitor the activities of processes 203 of various applications running in the computer 100. The detector 201 may monitor file operations and process operations of the processes 203. For performance reasons, the detector 201 may employ a whitelist of particular known processes (see arrow 211) that are excluded from monitoring, such as processes of web browsers and compilers. The whitelist may contain process identifiers of known applications that do not perform encryption or compression.

Upon detection of creation of a process 203 (see arrow 212), the detector 201 allocates storage areas (e.g., buffer, array) to hold a listing of read files R and a listing of write files W (see arrow 213) for the process 203. In one embodiment, each process 203 has its own listings of read files R and read files W. Upon detection of exiting of a process 203 (see arrow 214), the detector 201 cleans up (e.g., by erasing) the storage areas allocated for that process's 203 listings of read files R and write files W (see arrow 215). In one embodiment, under the Microsoft Windows™ operating system, process creation and exiting may be detected by registering a callback in the kernel to get process create and exit events. A similar callback may be set to get process creation and exit events in other platforms.

Upon detection of a read or write operation of a process 203, the detector 201 may apply filter conditions to determine if the file being read or written by the process 203 is to be included in the corresponding listing of read files R or listing of write files W (see arrow 216). In one embodiment, the filtering improves the accuracy and performance of the detector 201 by selectively including in the listings only those files that are normally accessed by the process 203 for read and write operations for editing. In one embodiment, the detector 201 only collects edit files for inclusion in the listing of read files R and listing of write files W, and ignores image files. Examples of edit files include Microsoft Word™ doc files, Microsoft Excel™ xls files, Adobe Acrobat™ pdf files, Microsoft Notepad™ cpp files, and the like.

In one embodiment, the detector 201 ignores image files, such as executable files (e.g., exe files and dynamic link library (DLL) files) that are loaded by a process 203. Image files may be identified by location and type. For example, the filtering conditions may indicate ignoring files located in the same folder as the process's 203 image file, files in the same folder as public libraries, and files of particular types (e.g., exe, DLL, so, and lib file types). Files ignored by the detector 201 as indicated by the filtering conditions are not collected for inclusion in the listing of read files R and the listing of write files W.

File create, read, write, and close operations performed by a process 203 are monitored by the detector 201. Under the Microsoft Windows™ operating system, the detector 201 may include or communicate with a driver to monitor file operations. A file operation may include a process ID (identifier) that identifies the process 203 performing the file operation.

The detector 201 may collect files that have been read and written by a process 203. In the example of FIG. 2, a file that has been read by a process 203 and has not been filtered out (see arrow 217) is included in a listing of read files R of that process 203 (see arrow 218). A listing of read files R may be represented as R={$r_1, r_2, \ldots, r_n$}, where $r_n$ is a read file, i.e., a file that has been read by the corresponding process 203. Similarly, a file that has been written by the process 203 and has not been filtered out (see arrow 219) is included in a listing of write files W of the process 203 (see arrow 220). A listing of write files W may be represented as W={$w_1, w_2, \ldots, w_m$}, where $w_n$ is a write file, i.e., a file that has been written by the corresponding process 203.

Figure 3:
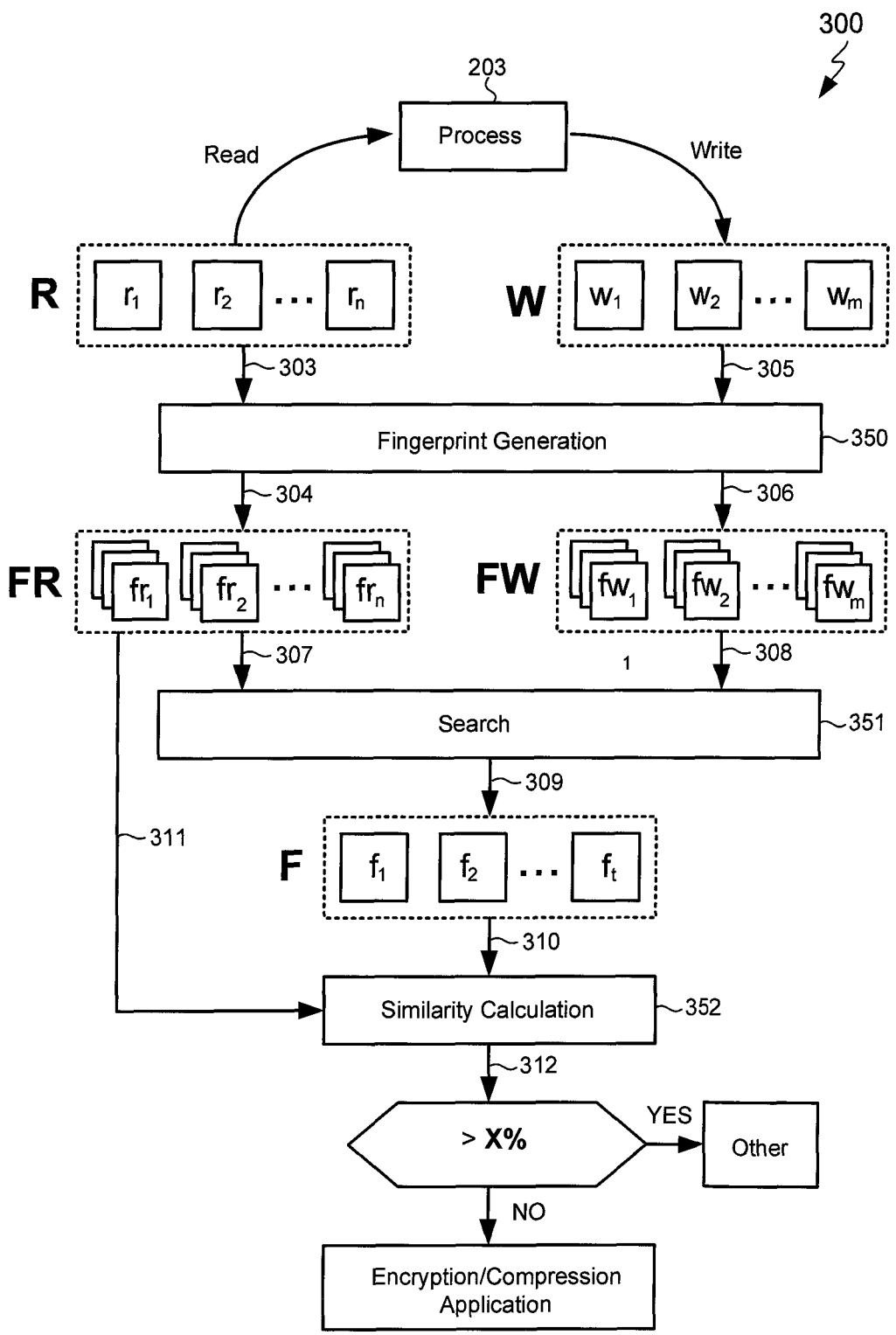
FIG. 3 shows a flow diagram of a method of detecting an encryption/compression application in accordance with an embodiment of the present invention.

FIG. 3 shows a flow diagram of a method 300 of detecting an encryption/compression application in accordance with an embodiment of the present invention. In one embodiment, the method 300 is performed by the detector 201. Other components may also be employed without detracting from the merits of the present invention. In the example of FIG. 3, the method 300 is illustrated as classifying a single process 203 in the interest of clarity. It is to be noted that in practice, the method 300 may be employed to classify a plurality of processes 203.

In the example of FIG. 3, the detector 201 generates the listing of read files R by collecting files that have been read by the process 203 (see arrow 303). The detector 201 also generates the listing of write files W by collecting files that have been written by the process 203 (see arrow 305). In one embodiment, only files that have not been filtered out are collected for inclusion in the listing of read files R and listing of write files W.

In the example of FIG. 3, the detector 201 includes a fingerprint generation engine 350 that generates a set of read fingerprints $fr_n$ for each read file $r_n$ (see arrow 304) and a set of write fingerprints $fw_m$ for each write file $w_m$ (see arrow 306). In one embodiment, a set of read fingerprints $fr_n$ is a vector and may be represented as $$fr_n = \{fr_n^1, fr_n^2, \ldots, fr_n^{k(n)}\} \quad \text{(EQ. 1)}$$

where k(n) is the total number of read fingerprints for the corresponding read file $r_n$. Similarly, a set of write fingerprints $fw_m$ may be a vector and may be represented as $$fw_m = \{fw_m^1, fw_m^2, \ldots, fw_m^{k(m)}\} \quad \text{(EQ. 2)}$$

where k(m) is the total number of write fingerprints for the corresponding write file $w_m$. That is, for the listing of read files R={$r_1, r_2, \ldots, r_n$}, the fingerprint generation engine 350 may generate a listing of read fingerprints FR={$fr_1, fr_2, \ldots, fr_n$}, with $fr_1$ being a set of read fingerprints of the read file $r_1$, $fr_2$ being a set of read fingerprints of the read file $r_2$, and so on. Likewise, for the listing of write files W={$w_1, w_2, \ldots, w_m$}, the fingerprint generation engine 350 may generate a listing of write fingerprints FW={$fw_1, fw_2, \ldots, fw_m$}, with $fw_1$ being a set of write fingerprints of the write file $w_1$, $fw_2$ being a set of write fingerprints of the write file $w_2$, and so on. The listing of read fingerprints FR may thus be represented as $$FR = \{fr_1, fr_2, \ldots, fr_n\} \quad \text{(EQ. 3)}$$

$$FR = \{fr_1^1, fr_1^2, \ldots, fr_1^{k(1)}, fr_2^1, fr_2^2, \ldots, fr_2^{k(2)}, \ldots$$
$$fr_n^1, fr_n^2, \ldots, fr_n^{k(n)}\} \quad \text{(EQ. 4)}$$

Similarly, the listing of write fingerprints FW may be represented as $$FW = \{fw_1, fw_2, \ldots, fw_m\} \quad \text{(EQ. 5)}$$

$$FW = \{fw_1^1, fw_1^2, \ldots, fw_1^{k(1)}, fw_2^1, fw_2^2, \ldots, fw_2^{k(2)}, \ldots$$
$$fw_m^1, fw_m^2, \ldots, fw_m^{k(m)}\} \quad \text{(EQ. 6)}$$

In one embodiment, the listing of read fingerprints $FR = \{fr_1, fr_2, \ldots, fr_n\}$ and listing of write fingerprints $FW = \{fw_1, fw_2, \ldots, fw_m\}$ are in strictly ascending order.

Generally speaking, a set of file fingerprints is a representation of the input file and is unique to the input file; a different input file will result in a different set of file fingerprints. In one embodiment, the fingerprint generation engine 350 creates a unique set of fingerprints for each read file and unique set of fingerprints for each write file, with each set of fingerprints being stable with changes to the corresponding read file and write file. That is, the set of fingerprints is not only unique to the input file, which is a read or write file in this case, but also does not change even with some changes to the input file. The stability of the set of fingerprints with respect to changes to the input file depends on the algorithm employed to generate the fingerprint.

In one embodiment, the fingerprint generation engine 350 employs the fingerprinting algorithm disclosed in commonly-assigned U.S. Pat. No. 8,359,472, which is incorporated herein by reference in its entirety. The fingerprinting algorithm disclosed in U.S. Pat. No. 8,359,472 includes normalizing a text string, applying a first hash function with sliding hash window to the normalized text string to generate an array of hash values, applying a first filter to the array of hash values to select candidate anchoring points, applying a second hash function to the candidate anchoring points to select anchoring points, and applying a second hash function to substrings located at the selected anchoring points to generate hash values for use as fingerprints. Other suitable fingerprinting algorithms may also be employed.

In the example of FIG. 3, the detector 201 further includes a search engine 351. In one embodiment, the search engine 351 searches the listing of read fingerprints for presence of each of the write fingerprints that are included in the listing of write fingerprints. That is, the search engine 351 searches $FW = \{fw_1, fw_2, \ldots, fw_m\}$ in $FR = \{fr_1, fr_2, \ldots, fr_n\}$ to find matched fingerprints. Searching for the write fingerprints in the listing of read fingerprints yields a listing of matched fingerprints $F = \{f_1, f_2, \ldots, f_t\}$, with a matched fingerprint $f_t$ being a fingerprint that is found in both the listing of read fingerprints FR and listing of write fingerprints FW. The search engine 351 may employ a dual binary search algorithm to find the matched fingerprints. More particularly, in one embodiment, the search engine 351 employs the search algorithm disclosed in commonly-assigned U.S. Pat. No. 8,266,150, which is incorporated herein by reference in its entirety. An example pseudo-code for a binary search algorithm that may be employed by the search engine 351 is disclosed in Appendix A. Other suitable search algorithms may also be employed.

Continuing with FIG. 3, the detector 201 performs a similarity calculation to determine the similarity between the files read by the process 203 and the files written by the process 203 (see block 352). In one embodiment, the detector 201 performs the similarity calculation based on the matching read fingerprints and write fingerprints, which in the example of FIG. 3 are included in the listing of matched fingerprints $F = \{f_1, f_2, \ldots, f_t\}$. The listing of matched fingerprints F provide an indication of how similar the read files are to the write files. By calculating the ratio of the number of matched fingerprints (see arrow 310) to the number of read fingerprints (see arrow 311), the detector 201 is able to determine the percentage of read files that are similar to the write files. In one embodiment, the detector 201 determines the similarity S as follows $$S = \frac{|F|}{|FR|} \quad \text{(EQ. 7)}$$

where |*| is the size of the vector/listing. For example, assuming there are 1,000 matched fingerprints and there are 2,000 read fingerprints, the similarity S between read files and write files is equal to 0.5, or 50%, meaning half of the files read by the process 203 are similar to the files written by the process 203.

The detector 201 may compare a calculated similarity value to a similarity threshold to determine if a process 203 is that of an encryption/compression application (see arrow 312). In one embodiment, the detector 201 deems that a process 203 with a similarity that is less than a similarity threshold is a process of an encryption/compression application. For example, assuming a similarity threshold X % is set to 20%, a process 203 with a similarity value of less than 20% is deemed to be a process of an encryption/compression application. Otherwise, when the similarity value of the process 203 is greater than 20% in that example, the process 203 is deemed to be of some other application that is not an encryption/compression application.

The similarity threshold may be adjusted depending on the particulars of the processes 203, the computer platform, and the fingerprinting algorithm employed. For example, experiments performed by the inventors indicate that in personal computers running the Microsoft Windows™ operating system, a similarity threshold X % may be set to 20%. In that case, a process 203 with a similarity less than 20% is deemed to be a process of an encryption/compression application.

Figure 4:
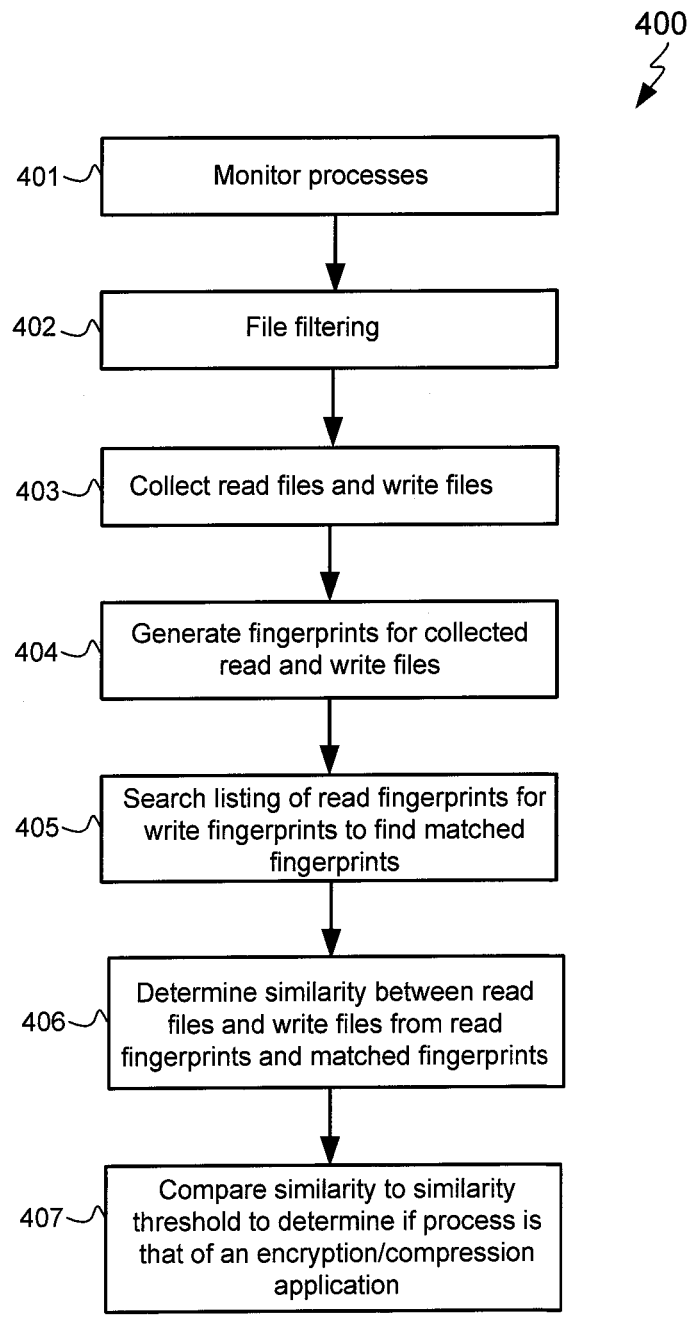
FIG. 4 shows a flow diagram of a method of detecting an encryption/compression application in accordance with an embodiment of the present invention.

FIG. 4 shows a flow diagram of a method 400 of detecting an encryption/compression application in accordance with an embodiment of the present invention. The method 400 may be performed by the detector 201. Other components may also be employed without detracting from the merits of the present invention.

In the example of FIG. 4, the detector 201 monitors a plurality of processes 203 running on the computer 100 (step 401). For a process 203 in the plurality of processes 203, the detector 201 performs file filtering to determine if a file being read by the process 203, i.e., a read file, is an edit file or an image file (step 402). The detector 201 also performs the same filtering for files written by the process 203, i.e., write files. In one embodiment, the detector 201 only collects edit files and ignores image files. The detector 201 adds edit files read and written by the process 203 into a listing of read files and a listing of write files, respectively (step 403). The detector 201 generates fingerprints of the read files and the write files (step 404). In one embodiment, the detector 201 generates a set of read fingerprints for each read file and a set of write fingerprints for each write file. The read fingerprints are included in a listing of read fingerprints and the write fingerprints are included in a listing of write fingerprints. The detector 201 searches the listing of read fingerprints for matching write fingerprints (step 405). A write fingerprint that matches a read fingerprint, i.e., a matched fingerprint, is included in a listing of matched fingerprints. The detector 201 thereafter calculates a similarity value that indicates similarity between the read and write files of the process 203. In the example of FIG. 4, the detector 201 determines the similarity between the read and write files from the read fingerprints and the matched fingerprints (step 406). For example, the detector 201 may calculate the similarity value based on the size of the listing of matched fingerprints in relation to the size of the listing of read fingerprints. The detector 201 may compare the calculated similarity value to a similarity threshold to determine if the process 203 is a process of an application that performs encryption, compression, or both (step 407). In one embodiment, the detector 201 deems a process 203 to be that of an encryption or compression application when the similarity value is less than a similarity threshold.

Tables 1 and 2 show test results of implementing the detector 201 in a personal computer running the Microsoft Windows™ operating system. Table 1 shows the results of similarity calculations for processes of three different encryption/compression applications, namely, TrueCrypt™, Winrar™, and 7Zip™ applications. Note that these applications result in a similarity of 0%, allowing for detection by the detector 201.

TABLE 1

|  | .doc | .docx | .pdf | .cpp | .xls | .xlsx |
|---|---|---|---|---|---|---|
| TrueCrypt | 0% | 0% | 0% | 0% | 0% | 0% |
| Winrar | 0% | 0% | 0% | 0% | 0% | 0% |
| 7Zip | 0% | 0% | 0% | 0% | 0% | 0% |

Table 2 shows the results of similarity calculations for processes of four other applications that are not encryption/compression applications, namely, Microsoft Word™ Microsoft Notepad™, Microsoft Excel™, and Adobe Acrobat Pro™ applications. These other applications were employed to perform some editing operations (copy, cut, delete, change) on read files. The resulting write files yield similarity values greater than 20% and as much as 99.5% in some cases. The similarity threshold may be adjusted as needed to obtain satisfactory detection rates while reducing false positives.

TABLE 2

|  | .doc | .docx | .pdf | .cpp | .xls | .xlsx |
|---|---|---|---|---|---|---|
| MS Word | 72.0% | 21.0% | — | — | — | — |
| Acrobat | — | — | 60.6% | — | — | — |
| Notepad | — | — | — | 99.5% | — | — |
| MS Excel | — | — | — | — | 28.6% | 22.2% |

Methods and apparatus for detecting encryption and compression applications have been disclosed. While specific embodiments of the present invention have been provided, it is to be understood that these embodiments are for illustration purposes and not limiting. Many additional embodiments will be apparent to persons of ordinary skill in the art reading this disclosure.

APPENDIX A

Dual Binary Search Algorithm:
Input:
  1. Reference list R[1,....,N] in strictly ascending order
  2. Target list T[1,...,M] in strictly ascending order
  3. Empty list S.

APPENDIX A-continued

```
Output:
  1. K: number of items of T in R.
  2. S: list of items of T in R.
Step: K = MVBS(S, R[1,...,N], T[1,...,M])
Remark: MVBS is a recursive function which returns the total number
of matched items with the following logic.
MVBS(S,R[L1,...,H1], T[L2,...,H2] ):
BEGIN
  IF L1 > H1 OR L2 > H2 THEN
    RETURN 0
  ENDIF
  M2 = (L2 + H2) / 2
  L = L1
  H = H1
  WHILE (L ≤ H) DO
    M1 = (L + H) / 2
    IF T[M2] > R[M1] THEN
      L = M1 + 1
    ELSE IF T[M2] < R[M1] THEN
      H = M1 - 1
    ELSE
      ADD T[M2] TO S
      V = 1 + MVBS(S, R[L1,...,M1-1], T[L2,...,M2-1]) + MVBS(S, R
      [M1+1,...,H1], T[M2+1,...,H2])
      RETURN V
    ENDIF
  END WHILE
  V = MVBS(S, R[L1,...,H],T[L2,...,M2-1]) + MVBS(S, R[L,...,H1],
  T[M2+1,...,H2])
  RETURN V
END MVBS
```

What is claimed is:

1. A computer-implemented method comprising:
    monitoring a process of an application program running in a computer;
    collecting a plurality of read files read by the process;
    collecting a plurality of write files written by the process;
    generating fingerprints of the plurality of read files to generate a plurality of read fingerprints;
    generating fingerprints of the plurality of write files to generate a plurality of write fingerprints;
    determining a similarity between the plurality of read files and the plurality of write files by comparing the plurality of read fingerprints and the plurality of write fingerprints; and
    determining if the application program is an obfuscation tool that is either an encryption or compression application based on the similarity.

2. The computer-implemented method of claim 1 wherein determining the similarity between the plurality of read files and the plurality of write files by comparing the plurality of read fingerprints and the plurality of write fingerprints comprises:
    searching a listing of the plurality of read fingerprints for presence of matching write fingerprints to identify a plurality of matched fingerprints; and
    comparing the listing of the plurality of read fingerprints to a listing of the plurality of matched fingerprints.

3. The computer-implemented method of claim 2 wherein comparing the listing of the plurality of read fingerprints to the listing of the plurality of matched fingerprints comprises:
    determining a ratio of a number of matched fingerprints in the plurality of matched fingerprints to a number of read fingerprints in the plurality of read fingerprints.

4. The computer-implemented method of claim 1 wherein only edit files are collected into the plurality of read files.

5. The computer-implemented method of claim 1 wherein image files are not collected into the plurality of read files.

6. The computer-implemented method of claim 5 wherein
files that are located in a particular location are not collected into the plurality of read files.

7. The computer-implemented method of claim 5 wherein a particular file type is not collected into the plurality of read files.

8. The computer-implemented method of claim 7 wherein the particular file type is an executable file.

9. The computer-implemented method of claim 1 wherein determining if the application program is an encryption or compression application based on the similarity comprises:
comparing the similarity to a similarity threshold; and
deeming the application program to be an encryption or compression program when the similarity is less than the similarity threshold.

10. A computer comprising:
a processor; and
a memory including computer-readable program code that when executed by the processor causes the computer to collect a plurality of read files read by a process, collect a plurality of write files written by the process, generate fingerprints of the plurality of read files to generate a plurality of read fingerprints, generate fingerprints of the plurality of write files to generate a plurality of write fingerprints, determine a similarity between the plurality of read files and the plurality of write files by comparing the plurality of read fingerprints and the plurality of write fingerprints, and determine if the application program is an obfuscation tool that is either an encryption or compression application based on the similarity.

11. The computer of claim 10 wherein the computer determines the similarity between the plurality of read files and the plurality of write files by searching a listing of the plurality of read fingerprints for presence of matching write fingerprints to identify a plurality of matched fingerprints, and comparing the listing of the plurality of read fingerprints to a listing of the plurality of matched fingerprints.

12. The computer of claim 11 wherein the computer compares the listing of the plurality of read fingerprints to the listing of the plurality of matched fingerprints by determining a ratio of a number of matched fingerprints in the plurality of matched fingerprints to a number of read fingerprints in the plurality of read fingerprints.

13. The computer-implemented method of claim 10 wherein the computer only collects edit files into the plurality of read files.

14. The computer of claim 10 wherein the computer determines if the application program is an encryption or compression application by comparing the similarity to a similarity threshold, and deeming the application program to be an encryption or compression application when the similarity is less than the similarity threshold.

* * * * *